(12) United States Patent
Josephy (10) Patent No.: US 6,210,524 B1
(45) Date of Patent: Apr. 3, 2001

(54) METHOD OF IMPROVING PEEL-PLATE DISPENSABILITY OF LABEL CONSTRUCTIONS

(75) Inventor: Karl Josephy, Los Angeles, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/389,551

(22) Filed: Sep. 3, 1999

(51) Int. Cl.$^7$ ..................................................... B32B 35/00
(52) U.S. Cl. .......................... 156/344; 156/247; 156/584; 156/498; 62/63
(58) Field of Search ...................... 156/247, 249, 156/344, 498, 541, 542, 584; 62/62, 63

(56) References Cited

U.S. PATENT DOCUMENTS

| | | | |
|---|---|---|---|
| 4,713,273 | 12/1987 | Freedman | 428/40 |
| 4,883,697 | 11/1989 | Dornbusch et al. | 428/35.7 |
| 5,186,782 | 2/1993 | Freedman | 156/244.11 |
| 5,451,283 | 9/1995 | Josephy et al. | 156/229 |
| 5,516,393 | 5/1996 | Freedman | 156/229 |
| 5,585,193 | 12/1996 | Josephy et al. | 428/515 |
| 5,789,046 | 8/1998 | Mueller | 428/35.2 |

Primary Examiner—Mark A. Osele

(74) Attorney, Agent, or Firm—Renner, Otto, Boisselle & Sklar

(57) ABSTRACT

The present invention provides a method of improving the peel-plate dispensability of die-cut and matrix-stripped label constructions which do not generally have the required minimum stiffness to be successfully peel-plate dispensed, particularly at room temperature. More particularly, the invention relates to a method of improving the peel-plate dispensability of a die-cut and matrix-stripped polymer film label construction comprising a facestock, a release liner, and a substrate adhesive layer between the facestock and the liner, which method comprises maintaining the temperature of at least the leading edge of the label below about 20° C. as the leading edge of the label construction moves over a peel-plate and the label is separated from the release liner. Maintaining the temperature of the label, of at least the leading edge of the label at a reduced temperature such as from about −15 to about +15° or even 20° C. temporarily increases the stiffness of the label, and, thus, when the cooled label is passed over the peel-plate, the label has the required stiffness to cause it to separate from the release liner and proceed in a straight line toward the application substrate. The invention is particularly applicable to thin label constructions (e.g., faceless constructions) which do not have the requisite stiffness at room temperature to be peel-plate dispensable at room temperature. The facestocks of the label constructions may be monolayer facestocks or multi-layer facestocks.

75 Claims, 2 Drawing Sheets

METHOD OF IMPROVING PEEL-PLATE DISPENSABILITY OF LABEL CONSTRUCTIONS

FIELD OF THE INVENTION

The present invention relates to a method of improving the peel- plate dispensability of label constructions, and more particularly, to die-cut and matrix-stripped label constructions.

BACKGROUND OF THE INVENTION

Pressure-sensitive adhesive (PSA) constructions such as labels, tapes, decals and the like are known in the art. For example, PSA label constructions are commonly used to apply a particular facestock having a specific nature of printing to an object or article. PSA label constructions typically comprise a release liner, a PSA layer disposed onto the liner, and a facestock laminated onto the PSA layer. This lamination may be formed by first coating or laminating the PSA to the liner, then laminating the facestock onto the PSA-coated liner; or alternatively by coating or laminating the PSA to the facestock, then the PSA-coated facestock onto the liner. The facestock is characteristically made from a web or sheet of paper, cardboard or plastic, which is printed on with information or other indicia either before or after it is laminated to the PSA and liner. A plastic facestock can be a single layer or multiple layers formed either by lamination or coextrusion. In a typical process of "converting" the facestock/PSA/liner laminate, the facestock is printed on the exposed facestock surface, die-cut down to the liner surface to outline the label shape, and the waste material between the labels (matrix) is stripped out. The PSA label facestock and adhesive is then adhered to a substrate surface by separating the label from the liner and causing the PSA layer of the label to come into contact with and bond to the substrate surface with the PSA layer providing the bonding force (as measured by a peel test). In the most popular labeling process, the label is separated from the liner by bending the liner back over a peel-plate, whereupon the label is sufficiently stiff to cause the label to continue on a straight path toward the desired substrate surface overcoming the release force between the label adhesive and the silicone coated release liner. Peel-plate dispensing is generally done at room temperature.

As used in this patent application, "separation" refers to removal of the label from the liner, "application" refers to adhesion of the label to the substrate surface, and "dispensing" or "dispensability" refers to the combined steps of separation and application. "Peel-plate dispensing" as used herein, denotes the use of a peel-plate, sharp edge, or other similar device having a small radius of curvature, in the separation of liner from label.

The term "faceless" pressure sensitive adhesive constructions is used in the present application to refer to the very thin (e.g., less than 1 ml, preferably 0.1 to 0.5 or 0.6 mils), and to contrast the manufacturing methods disclosed herein from conventional PSA label construction manufacturing methods. As discussed above, in conventional manufacture of PSA label materials, a self supporting preformed web or sheet is laminated to a PSA ("preformed" means that the facestock had been formed into a self supporting web or sheet in a previous manufacturing process, and in the case of a liquid or molten facestock material, that the material has been dried or hardened). Faceless constructions of the present invention are formed by coextrusion of a film forming material (herein sometimes referred to as "FFM") and an adhesive whereby the facestock web or sheet and the adhesive are formed in situ.

In the manufacture and production of PSA constructions, a substantial amount of the overall cost involved is attributed to the material costs for the different material layers, e.g., the PSA and the facestock, be it paper, cardboard, or plastic, and this is one constraint on the selection of the type and thickness of the various layers. The layer thicknesses and layer materials for such conventional PSA constructions must also be selected to provide desired properties of convertibility, e.g., by conventional converting techniques such as by die-cutting and matrix-stripping; dispensability, e.g., by conventional dispensing equipment such as by peel-plate; and conformability, e.g., enabling the applied label to adhere to an irregular or deformable substrate surface without becoming detached or damaged.

It is known that the stiffness of a PSA construction will have an impact on its convertibility and dispensability. The stiffness of a label of a given material decreases as the label is made thinner. As a rule of thumb, as the construction stiffness is increased, so is convertibility and dispensability of the construction. However, the conformability of a PSA construction is known to decrease as the construction stiffness is increased. Thus, the objective stiffness for a PSA construction is a compromise between convertibility/dispensability, conformability, and cost. Too low a stiffness of the label will cause the label to go around the peel-plate with the liner. It is one objective of this invention to provide a minimal material label construction with enough stiffness to be dispensable using a peel-plate.

Prior art PSA constructions having a Gurley stiffness of at least and more commonly of at least 20 or greater are known and are described in U.S. Pat. Nos. 5,186,782; 5,516,393; 4,713,273; and 5,451,283. The '782, '393 and '283 patents exploited the idea that a proper differential between machine direction stiffness and cross dimension stiffness, with the latter being the lower of the two, could enable a heat-set film to be dispensed at high speeds, yet be suitable for flexible-film end uses. Such label film might exhibit acceptable overall conformability to flexible substrates even though the film has less inherent conformability than the then standard polymer labels based on polyvinyl chloride (PVC).

Specific end uses calling for highly-conformable PSA constructions include those where the label is to be adhered to a small-diameter contoured surface or irregular surface. In such an end use, unnecessary construction stiffness or rigidity could interfere with label's ability to conform and remain adhered to the underlying substrate surface. Additionally, these conventional PSA constructions are not manufactured in a most economically efficient manner.

SUMMARY OF THE INVENTION

The present invention provides a method of improving the peel-plate dispensability of die-cut and matrix-stripped label constructions which do not generally have the required minimum stiffness to be successfully peel-plate dispensed, particularly at room temperature. More particularly, the invention relates to a method of improving the peel-plate dispensability of a die-cut and matrix-stripped polymer film label construction comprising a facestock, a release liner, and a substrate adhesive layer between the facestock and the liner, which method comprises maintaining the temperature of at least the leading edge of the label below about 20° C. as the leading edge of the label construction moves over a peel-plate and the label is separated from the release liner. Maintaining the temperature of the label, of at least the leading edge of the label at a reduced temperature such as from about −15 to about +15° or even 20° C. temporarily increases the stiffness of the label, and, thus, when the cooled label is passed over the peel-plate, the label has the required stiffness to cause it to separate from the release liner and proceed in a straight line toward the application substrate. In the present invention, facestock materials which cannot be used to prepare label constructions which are dispensable at room temperature may now be used in the formation of even thin constructions if the construction is cooled or has been previously cooled prior to passing over the peel-plate. The invention is particularly applicable to thin label constructions (e.g., faceless constructions) which do not have the requisite stiffness at room temperature to be peel-plate dispensable at room temperature. The facestocks of the label constructions may be monolayer facestocks or multilayer facestocks.

DETAILED DESCRIPTION OF EMBODIMENTS OF THE INVENTION

In one embodiment, the method of the invention relates to a method of improving the peel-plate dispensability of a die-cut and matrix-stripped label construction which normally does not have the required machine direction (MD) stiffness to be successfully dispensed over a peel-plate at room temperature. It has now been discovered that the (MD) stiffness of label constructions characterized as having insufficient stiffness, particularly at room temperature, to be successfully dispensed over a peel-plate can be increased temporarily by lowering the temperature of the label construction, or at least the leading edge of the construction as or before it passes over a peel back edge of a peel-plate. Label construction temperatures of about 15° or less are preferred, and temperatures of from about −15° C. to about 5° C. are useful. The temperature which is selected is one which provides a sufficient increase in the machine direction stiffness of the label construction (e.g., in one embodiment, at least about 10 or 15 Gurley units) to enable the construction to be peel-plate dispensed successfully. In general, the label construction having an insufficient stiffness at room temperature will be cooled to a temperature which provides a label construction having a temporary machine direction stiffness (Gurley) of at least 10 and preferably at least 15 or 20 mg. In another embodiment, the label constructions are those wherein the label facestock is characterized as exhibiting an increase in the MD Gurley stiffness of at least about 10 units (mg) or even 15 units when the temperature of the facestock is reduced from 25° C. to about 5° C. Gurley stiffness is measured in accordance with TAPPI Test 543 pm.

As mentioned above, the label constructions useful in the present invention comprise a facestock, a release liner, and a substrate adhesive layer between the facestock and the liner. The facestock which is utilized in the label constructions may comprise any of a variety of flexible materials known to those skilled in the art to be suitable as a facestock material. For example, the facestock may be composed of such materials as paper (e.g., kraft, bond, offset, litho and sulfite paper) with or without sizing, or polymeric materials suitable for facestock use such as polyolefins, polyesters, polyamides, etc. as will be described in more detail below. In one embodiment, the requirement for the facestock material is that it be capable of forming some degree of adhesive bond to an adhesive layer. In a preferred embodiment, the facestock comprises a polymeric film which can form the desired bond and which is capable of being printed. In yet another embodiment, the polymeric film material is one which, when combined with the adhesive layer, provides a sufficiently self-supporting construction to facilitate label dispensing (label separation and application). The surfaces of the facestock material can be corona treated to improve printability and or adhesion to the adhesion layer in contact therewith. Preferably the polymer film material is chosen to provide the label construction with one or more of the desired properties such as printability, die-cuttability, matrix-strippability, dispensability, etc.

The facestocks may be monolayer polymeric film facestocks or they may comprise more than one polymer film layer some of which may be separated by an internal adhesive layer. The layers of the multilayer facestocks may be represented by the formula A(BC)x where A, B and C are layers of polymer films, B may be a layer of adhesive and x is at least 1 up to 500 or even 300 or higher. Layer C may be of the same material as A. The thicknesses of each of the layers may be varied. Multilayer film facestocks may be prepared by techniques well known to those skilled in the art such as by laminating two or more preformed polymeric films (and, optionally an adhesive layer) together, or by the coextrusion of several polymeric films and, optionally, an adhesive layer. The multilayer facestocks may be prepared also by sequential coating and formation of individual layers, triple die coating, extrusion coating of multiple layers onto an adhesive layer, etc.

Figure 3:
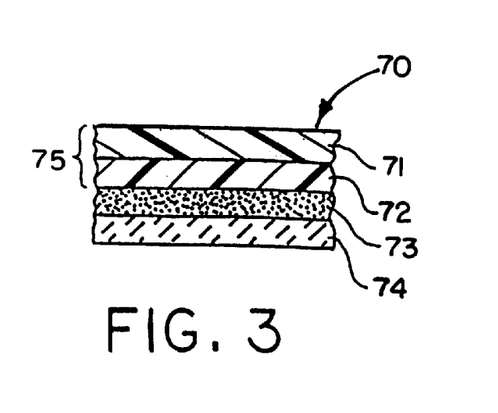
FIG. 3 is a cross-sectional side view of another construction useful in this invention.
Figure 4:
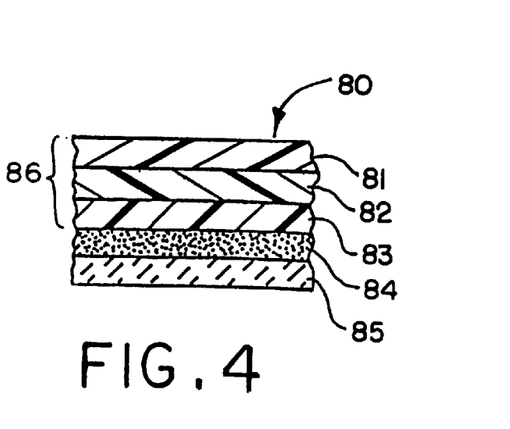
FIG. 4 is a cross-sectional side view of yet another construction useful in the present invention.

In one embodiment, the facestock comprises a coextruded polymer facestock comprising a base layer having an upper surface and a lower surface, and a skin layer on at least the upper surface of the base layer. FIG. 3 is a cross-section of a label construction utilizing this type of facestock. In particular, FIG. 3 illustrates the label construction 70 which comprises a facestock 75 comprising a base layer 72 and a skin layer 71, an adhesive layer 73 and a release liner 74. In another embodiment, the base layer also has a skin layer on the lower surface of the base layer. FIG. 4 is a cross-section of a label construction 80 containing such a facestock 86 which comprises a base layer 82, a first skin layer 81 and a second skin layer 83. The facestock 86 is adhered to an adhesive layer 84 through the second skin 83, and the adhesive layer 84 is adhesively bonded to a release liner 85.

These multilayer facestocks identified as 75 and 86 in FIGS. 3 and 4, respectively preferably are prepared by coextrusion, and the base layer generally is thicker than the skin layers. The base layer may contain particulate filler particles or may be substantially free of particulate filler particles. Similarly, the skin layer on the upper surface of the base layer may or may not contain filler particles, but generally, the skin layer on the upper surface of the base layer is free of filler particles. The skin layer on the upper surface of the base layer generally is selected to provide the desirable properties such as high weatherability, printability, uniformity and control of surface texture, whether gloss or matte, etc. whereas these properties are not necessary or they are required in a lesser degree in the base layer or the second skin layer which is in contact with the lower surface of the base layer. The choice of film material is determined by the properties desired for the various layers. Generally, the polymeric film materials may be selected from polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In a preferred embodiment, the base material is a polyolefin such as polyethylene or polypropylene, and the skin layers comprise polyolefins, ethylene vinyl acetate copolymers, polyvinyl chloride, and mixtures thereof. The two skin layers may or may not be prepared from the same polymer. In some instances, the polymer utilized for the second film (the inner skin) will be chosen to provide better anchorage to a substrate adhesive.

Other materials for the skin layers include meltable film-forming substances used alone or in combination, such as polyethylene, methyl polyacrylic acid, polyethylene ethyl acrylate, polyethylene methyl acrylate, acrylonitrile, butadiene, styrene polymer, nylon, polybutylene, polystyrene, polyurethane, polysulfone, polyvinylidene chloride, polypropylene, polymethyl pentene, styrene maleic anhydride polymer, styrene acrylonitrile polymer, ionomers based on sodium or zinc salts of ethylene/methacrylic acid, polymethyl methacrylates, cellulosics, fluoro plastics, polyacrylonitriles, and thermoplastic polyesters. Facestocks comprising a base layer and skin layers on either side of the base layer, formed by coextrusion, are described in more detail in U.S. Pat. No. 5,700,564, the disclosure of which is hereby incorporated by reference.

In another embodiment, the multilayer facestock may comprise first and second continuous polymeric films, each having an upper surface and a lower surface, and each independently having a thickness of from about 0.1 to about 2 mils, said first and second films being separated by a continuous layer of material (hereinafter sometimes referred to as the separation layer) having a Young's Modulus less than the Young's Modulus of the first and second polymeric films. Young's Modulus is measured according to ASTM test method D882.

The continuous layer of material used to separate the two polymeric film layers of the facestock in this embodiment and having a lower Young's Modulus than the adjacent first and second polymer films can comprise any number of materials such as, for example, polymeric films, thin foam materials, and interior adhesives such as pressure sensitive adhesives. The total thickness of the two polymer films and the separation layer is between about 0.2 to about 3.5 mils, more preferably from about 0.2 to about 2.5 mils, more preferably from about 0.4 to about 2.35 mils or to about 2.5 mils. The thickness of the separation layer may generally range from about 0.02 to about 2 mils, and more often will be from about 0.02 to about 1.0 mil. One preferred separation layer is a continuous layer of adhesive such as the pressure sensitive adhesives described below. When a PSA is used as the separation layer, the PSA does not have to have all of the properties of a standard PSA. For example, the interior PSA needs to have only enough tack to adhere to the film on either side. The use of an interior adhesive layer also appears to contribute to the adhesive properties of the overall constructions of the invention. In the interest of minimizing costs, the continuous polymeric films can comprise a polyolefin or olefin blend which elongates under the use conditions and contributes to the adhesive properties, particularly when the continuous polymeric film deforms under peel conditions.

In another embodiment, the facestock may comprise (A) a separation layer of polymeric film material having an upper surface and a lower surface, (B) a first skin layer of polymeric material having an ink printable upper surface and a lower surface, (C) a second skin layer of polymeric material having an upper surface and a lower surface, (D) a first stiffening layer between and joined to the upper surface of the separation layer and the lower surface of the first skin layer, and (E) a second stiffening layer between and joined to the lower surface of the separation layer and the second skin layer, wherein each of said first and second stiffening layers comprises a polymeric film material having a Young's Modulus that is greater than the Young's Modulus of the separation layer and the skin layer on either side of the stiffening layer. The ratios of the thicknesses of the first skin/first stiffening/separation/second stiffening/second skin layers may vary over a wide range although the separation layer generally is the thickest layer. Ratios ranging from 1/1/96/1/1 to 15/5/60/5/15 are useful. A particularly preferred ratio is 10/5/70/5/10. One preferred method for preparing the multilayer composite constructions of this embodiment is by coextrusion of the layers. In one embodiment, the composite construction is a balance coextrudate. This is particularly preferred to control curl. A balanced coextrusion occurs when the first and second skins as well as the first and second stiffening layers are similar or equivalent in terms of thickness and material.

Such composites exhibit higher stiffnesses than similar composites where the stiffening layers are omitted or when the stiffening material is present as a single unseparated layer. The composites generally are formed by coextrusion of the five layers of polymer material, and the composites may be combined with an adhesive layer and a release liner to form label stock which is die-cuttable, matrix-strippable.

The first and second polymeric films of the facestocks can be obtained from any polymeric material that is capable of being extruded, and particularly polymeric materials that can be coextruded with a variety of adhesives, and more particularly, as described below, with pressure sensitive adhesives. For example, it may be desired that the polymeric film material have a solubility parameter that is inconsistent with or incompatible with that of the adhesive to prevent migration between the two layers when coextruded. Alternatively, these facestocks can be prepared by other processes known to those skilled in the art. For example, the composite facestocks can be formed by applying an adhesive layer to a release surfaces of a removable substrate and sequentially deposition a layer of film-forming material, a second layer of adhesive (internal adhesive) and a second layer of film forming material. The various polymeric and adhesive materials can be applied to the surface of the first adhesive layer in the form of a hot melt, aqueous dispersion or solution by roll, spray, electrostatic, die or extrusion processes. The polymeric film material also should, when combined with the adhesive layer, provide a sufficiently self-supporting construction to facilitate label dispensing (label separation and application.) Preferably, the polymeric film material is chosen to provide the construction with the desired properties such as printability, die-cuttability, matrix-strippability, dispensability, etc.

The facestocks (mono- or multilayer) can be uniaxially or biaxially oriented (e.g., by heat stretching and heat setting) to improve the properties of the facestock. Orientation in the machine direction will increase machine direction stiffness and improve dispensability. Machine direction or biaxial orientation of the composite facestocks can be accomplished by techniques well known in the art. Stretch ratios of from about 2:1 to 10:1 are useful, and a stretch ratio in the range of about 4:1 to 9:1 is preferred. A most preferred range is from about 5:1 to 8:1.

The polymeric film materials useful in the facestocks (monolayer or multilayer) include polystyrenes, polyolefins, polyamides, polyesters, polycarbonates, polyvinyl chloride, polyvinyl alcohol, poly(ethylene vinyl alcohol), polyurethanes, polyacrylates, poly(vinyl acetates), ionomers and mixtures thereof. In one embodiment, the polymeric film material is a blend of a major amount of a polyolefin. Typically, the blends contain greater than 55%, or greater than 70% by weight polyolefin. The polyolefins may be blended with one or more of the polymers listed previously. A preferred blend is the blend of a polyolefin and a poly (vinyl) acetate such as ethylene vinyl acetate. In one preferred embodiment, the polymeric film material is a polyolefin. The polyolefin film materials generally are characterized as having a melt index or melt flow rate of less than 30, more often less than 20, and most often less than 10 as determined by ASTM Test Method 1238.

The polyolefins which can be utilized as the polymeric film material include polymers and copolymers of ethylene, propylene, 1-butene, etc., or blends of mixtures of such polymers and copolymers. Preferably, the polyolefins comprise polymers and copolymers of ethylene and propylene. In another preferred embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymeric film material including low, medium, and high density polyethylenes. An example of a useful low density polyethylene (LDPE) is Rexene 1017 available from Huntsman.

The propylene homopolymers which can be utilized as the polymeric film material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L. In one embodiment, propylene homopolymers having MFR's of less than 10, and more often from about 4 to about 10 are particularly useful and provide facestocks having improved die-cuttability. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one preferred embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation D56D20. Another Union Carbide propylene-ethylene copolymer is D56D8, which contains 5.5% by weight of ethylene.

Particularly useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695. Some of the physical properties of polymer films formed from the Uni-Rez polyamides are summarized in the following Table I.

TABLE I

| Uni-Rez Product | Softening Point (° C.) | Brookfield Viscosity (cPs at 190° C.) | Tensile Strength (PSI) | Percent Ultimate Elongation |
| --- | --- | --- | --- | --- |
| 2620 | 105 | 900 | 1000 | 50 |
| 2623 | 106 | 6500 | 1000 | 400 |
| 2665 | 165 | 11,000 | 2000 | 500 |
| 2695 | 128 | 5000 | 200 | 175 |
| 2620/2623 (blend at 1:3) | 128 | 5100 | 1000 | 313 |

Polystyrenes can also be utilized as the polymeric film material in the facestocks, and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymeric film material and the polyurethanes may include aliphatic as well as aromatic polyurethanes.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the coextruded adhesive constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid; etc.

Isonomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G. E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

The polymeric film materials may contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid aceptors, etc.

Various nucleating agents and pigments can be incorporated into the films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the die-cuttability of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention are generally quite small and range from about 100 to about 6000 ppm of the film. Preferably the amount of nucleating agent is in the range of about 1000 to about 5000 ppm.

The polymeric film material for the facestocks is chosen to provide a continuous polymer film in the product with the desired properties such as improved printability, weatherability, strength, water resistance, abrasion resistance, gloss, die-cuttability, and matrix strippability. It is particularly desirable that the upper outer surface of the facestock (e.g., the first film and first skin layer) can be printed or adapted to be printed with inks using printing techniques such as flexographic printing, screen printing, offset lithography, letter press, thermal transfer, etc., and that the applied ink has acceptable adhesion to the surface of the film of the adhesive construction. The choice of polymeric film forming material also is determined by its physical properties such as melt viscosity, high speed tensile strength, percent elongation etc. As will be discussed in more detail below, coextrusion of the polymeric film materials and the adhesives to form the coextrudate of the first embodiment is facilitated when the melt viscosities of the two materials, i.e., the polymeric film material of the first layer and the adhesive material, are similar. Thus, the choice of polymeric film material to be utilized in the formation of the coextruded adhesive constructions of the present invention may be dependent upon the melt viscosity of the adhesive being coextruded with the polymeric film forming material. In one embodiment, the polymeric film material of the first layer preferably has a hot melt viscosity that is within a factor of from about 0.07 to about 15 times, more often greater than 1 to about 15 times, and preferably from 1 up to about 10 times the hot melt viscosity of the adhesive at the shear rates incurred in the coextrusion process.

The thicknesses of the polymer film layers are independently from about 0.1 to about 1.5 or even 2.0 mils. More often the thicknesses of the films are from about 0.2 to about 1.0 mil. A thickness of about 0.5 mils is particularly useful. The overall thickness of the facestock and substrate adhesive composite is from about 0.2 mil to about 2.35 mils, 2.5 mils or even 3.0 mils. One preferred range of overall thickness for the adhesive composite is from about 1 to 2.4 mils, more preferably from 1.5 to 2.4 mils.

Turning now to the adhesives, the label constructions also include a substrate adhesive layer having an upper surface and a lower surface wherein the upper surface of the substrate adhesive layer is adhesively joined to the lower surface of the facestock. In some embodiments, as noted above, the constructions also contain an interior adhesive. The adhesives (substrate and internal) may be a heat-activated adhesives, hot melt adhesives, or pressure sensitive adhesives (PSA). Adhesives which are tacky at any temperature up to about 160° C. (about 320° F.) are particularly useful. PSAs which are tacky at ambient temperatures are particularly useful in the adhesive constructions of the present invention. A variety of conventional PSAs can be utilized provided that the viscosity is or can be modified to be similar to the viscosity of the polymeric film material which is being coextruded with the adhesive. Useful PSA compositions are fluid or pumpable at the temperatures used in the melt processing. Also, the adhesive compositions should not significantly degrade or gel at the temperature employed and over the time required for melt processing and extrusion. Typically, the adhesive compositions have a viscosity of from 1000 poise to 1,000,000 poise at the processing temperature.

The adhesives may generally be classified into the following categories:

Random copolymer adhesives such as those based upon acrylate and/or methacrylate copolymers, a-olefin copolymers, silicone copolymers, chloroprene/acrylonitrile copolymers, and the like.

Block copolymer adhesives including those based upon linear block copolymers (i.e., A-B and A-B-A type), branched block copolymers, star block copolymers, grafted or radial block copolymers, and the like, and Natural and synthetic rubber adhesives.

A description of useful pressure-sensitive adhesives may be found in *Encyclopedia of Polymer Science and Engineering,* Vol. 13. Wiley-Interscience Publishers (New York, 1988). Additional description of useful pressure-sensitive adhesives may be found in *Encyclopedia of Polymer Science and Technology,* Vol. 1, Interscience Publishers (New York, 1964).

Commercially available pressure-sensitive adhesives are useful in the invention. Examples of these adhesives include the hot melt pressure-sensitive adhesives available from H. B. Fuller Company, St. Paul, Minn. as HM-1597, HL-2207-X, HL-2115-X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one preferred embodiment, the pressure sensitive adhesives utilized in the present invention comprise rubber based elastomer materials such as linear, branched, grafted, or radial block copolymers represented by the diblock structures A-B, the triblock A-B-A, the radial or coupled structures (A-B)$_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering, Vol.* 2, (1985) John Wiley & Sons, Inc., New York, pp. 325–326, and by J. E. McGrath in *Block Copolymers, Science Technology,* Dale J. Meier, Ed., Harwood Academic Publishers, 1979, at pages 1–5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, (AB)$_{1,2}$. . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromosty-rene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Shell Chemical Company and listed in the following Table II.

TABLE II

| Kraton | Type | Styrene/Rubber Ratio (w) | Melt Index |
| --- | --- | --- | --- |
| D1101 | Linear SBS | 31/69 | <1 |
| D1107P | Linear SIS | 15/85 | 11 |
| D1111 | Linear SIS | 22/78 | 3 |
| D1112P | Linear SIS | 15/85 | 23 |
| D1113P | Linear SIS | 16/84 | 24 |
| D1117P | Linear SIS | 17/83 | 33 |
| D1320X | Multi-arm $(SI)_n$ | 10/90 | NA |

Vector 4111 is a SIS block copolymer available from Dexco of Houston, Texas.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethyl-ene/propylene)-styrene block polymer. When a polystyrene-polybutadiene--polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of Gi 652 is available from Shell under the designation Kraton G1650. Kraton G1651 is another SEBS block copolymer which contains about 33% by weight of styrene. Kraton GI 657 is an SEBS diblock copolymer which contains about 13% w styrene. This styrene content is lower than the styrene content in Kraton G1650 and Kraton G1652.

In another embodiment, the selectively hydrogenated block copolymer is of the formula $$B_n(AB)_o A_p$$

wherein n=0 or 1;

o is 1 to 100;

p is 0 or 1;

each B prior to hydrogenation is predominantly a polymerized conjugated diene hydrocarbon block having a number average molecular weight of about 20,000 to about 450,000;

each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha,beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5--di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901 X, FG1921X, and FG1924X from Shell, often referred to as maleated selectively hydrogenated SEBS copolymers. FG1901X contains about 1.7% w bound functionality as succinic anhydride and about 28% w of styrene. FG1921 X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

The polymer film materials and adhesive compositions used to form the constructions useful in the present invention may be neat, or they may be emulsions or solvent-based. Emulsion and solvent-based acrylic based PSAs are known and described in, for example, U.S. Pat. Nos. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. No. 5,716,669 (LaRose et al). It is preferred, however, that the film materials and PSAs which are coextruded are compositions substantially free (e.g., less than 1% w) of water and/or solvents. The presence of water or solvents during the coextrusion process can result, and generally does result, in pinholes and bubbles in the coextruded film. The presence of voids in the film due to steam is referred to in the art as "moisture slits."

Since the adhesive constructions in some embodiments useful in the present invention are formed by coextruding two films of the above described polymeric film materials and two adhesive layers as described more fully below, the hot melt viscosity of the polymeric film materials and of the adhesive should be within a window or range of viscosities which can produce a coextrudate of continuous and uniform layers of the polymeric film material and the adhesive in order to avoid film defects and intermingling of the polymeric film material and the adhesive during the coextrusion process. Intermingling of the film material and the adhesive is not desired because it can cause a loss of clarity in the extruded film, as well as a tendency to cause blocking. In general, it is preferred that the polymeric film material have a hot melt viscosity that is within a factor of from about 0.07 to about 15 times the hot melt viscosity of the adhesive at the shear rates incurred during the coextrusion process. Generally the shear rates range from about 100 to about 10,000 $sec^{-1}$. More often the factor is from about 1 to about 15. A preferred factor is from 1 to about 10. It is also desirable that the polymer film material and the adhesive have relatively similar melt viscosities at the extrusion temperatures. For example, when the PSA is a conventional hot melt adhesive, the extrusion temperatures of the PSA are in the range of from about 150° C. to about 200° C., and preferably in the range of from about 175° C. to about 200° C. It is, therefore, desired that the polymeric film material selected for use with the PSA have an extrusion temperature below about 200° C. and preferably in the range of from about 150° C. to about 180° C.

It is desired, in some embodiments, that the continuous polymeric films in the constructions of the invention have a high speed tensile strength of at least 1 pound/inch-width, and more often, a high speed tensile strength in the range of from about 2 to about 10 pounds/inch-width. High speed tensile strength is determined in accordance with TAPPI Test T494 modified by running the sample at 100 ft./1 min. The high speed tensile strength of the polymer film should be sufficient, at the given thickness, to permit matrix stripping after die-cutting without undue tearing of the film. It is also desirable that the polymeric film material in the constructions of the present invention have an elongation at break of less than about 200%, and more preferably, in the range of from about 125% to about 175%. A polymeric film material having an ultimate elongation at break greater than about 200% can produce an adhesive construction that is difficult to convert by die-cutting and matrix-stripping, depending on the type of adhesive and polymeric film material, and on their respective coating weights.

In one preferred embodiment of the invention described above, the key features of the adhesive constructions include (1) the use of thin polymeric films and (2) adhesive layers having relatively low coat weights. Thus, the adhesive constructions are characterized as comprising at least two polymeric films, each with a thickness of from about 0.1 mil up to about 1.5 or 2 mils, and an adhesive coating weights of less than 40, and preferably less than 20 $g/m^2$. In one embodiment, the adhesive layers have a coat weight in the range of from about 0.5 to about 20 $g/m^2$. Alternatively, the thickness of the adhesive layer may range from about 0.02 mils to about 2 mils, and more preferably, between about 0.02 mil and about 1 mil. It should be understood that the thickness and coat weight of both the polymer films and the adhesive layers may vary depending upon the different types of polymer film material and adhesives that are selected, and the properties desired in the adhesive construction.

As mentioned above, the adhesive compositions useful in the label constructions may comprise thermoplastic elastomers comprising at least one thermoplastic elastomeric block copolymer which include linear, branched, grafted or radial block copolymers. In addition, the adhesive compositions also contain at least one solid tackifier resin component. A solid tackifier is defined herein as one having a softening point above 80° C. When the solid tackifier resin component is present, the coextrudable pressure-sensitive adhesive compositions generally comprise from about 40% to about 80% by weight of a thermoplastic elastomer component and from about 20% to about 60% by weight (preferably from about 55% to 65% by weight) of a solid tackifier resin component. The solid tackifier reduces the modulus of the mixture sufficiently to build tack or adhesion. Also, solid tackifiers (particularly the higher molecular weight solid tackifiers (e.g., Mw greater than 2000) and those having a lower dispersity (Mw/Mn=less than about 3)) are less sensitive to migration into the polymer film layer, and this is desirable, since migration of tackifier into the polymer film layer causes dimensional instability, and the constructions can swell and/or wrinkle, and may become too soft. In addition, the constructions may lose adhesive properties or cause blocking, and the ability of the polymer film to be printed satisfactorily may be reduced by migration of the tackifier. For example, attempts to print the polymeric film layer after migration of tackifier or other components from the adhesive layer may result in poor anchorage of the ink and/or blurring of the printing. Migration of the tackifier and other components present in the adhesive layer is a particular problem when the polymer film comprises a polyolefin such as polyethylene.

Conventional solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. One particular example of a useful solid tackifier is Escorez 2596 which is a $C_5$–$C_9$ (aromatic modified aliphatic) synthetic tackifier having an Mw of 2100 and a dispersity (Mw/Mn) of 2.69. Another useful solid tackifier is Escorez 1310LC, identified as an aliphatic hydrocarbon resin having an Mw of 1350 and a dispersity of 1.8. Wingtack 95 is a synthetic tackifier resin available from Goodyear, Akron, Ohio, consisting predominantly of polymerized structure derived from pyperylene and isoprene.

The modulus of the adhesive mixtures also may be lowered by the incorporation of liquid rubbers, i.e., liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which are coextrudable with the polymeric film materials. The incorporation of a liquid rubber also produces an adhesive having increased tack and adhesion. Liquid block copolymers such as liquid styrene-isoprene block copolymers are particularly useful. For example, Kraton LVSI-101, available from the Shell Chemical Company, is effective in lowering the modulus of the adhesive, and it has been found, surprisingly, that this liquid styrene-isoprene block copolymer functions as a processing aid, improving the smoothness of the flow of the adhesive from the die. Kraton LVSI-101 has a weight average molecular weight of about 40,000. Another example of a useful liquid rubber is a liquid polyisoprene obtained by selectively or partially degrading a high molecular weight polyisoprene. An example of a commercially available partially degraded high molecular weight polyisoprene is Isolene D-400 from Elementis Performance Polymers, Belleville, N.J., and this liquid rubber has an Mw of about 20,000. Other liquid rubbers which may be incorporated into the adhesive mixture include liquid styrene-butadiene rubbers, liquid butadiene rubbers, ethylene-propylene rubbers, etc.

The adhesive compositions also may include other materials such as antioxidants, heat and light stabilizers, ultraviolet light absorbers, viscosity modifiers, fillers, colorants, antiblocking agents, reinforcing agents, processing acids, etc. Hindered phenolic and amine antioxidant compounds may be included in the adhesive compositions, and a wide variety of such antioxidant compounds are known in the art. A variety of antioxidants are available from Ciba-Geigy under the general trade designations "Irganox" and "Irgafos". For example, the hindered phenolic antioxidant n-octadecyl 3-(3,5-di-t-butyl-4-hydroxyphenol)-proprionate is available under the general trade designation "Irganox 1076". Irganox 1010, is identified as Tetrakis (methylene 3-(3', 5'-di-tert-butyl-4'-hydroxyphenol) proprionate) methane.

Irgafos 168 is another useful antioxidant from Ciba-Geigy.

Hydroquinone-based antioxidants also may be utilized, and one example of such an antioxidant is 2,5-di-tertiary-amyl-hydroquinone.

Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive compositions, like the polymeric films, may contain inorganic fillers and other organic and inorganic additives to provide desired properties. Examples of useful fillers include calcium carbonate, titanium dioxide, metal particles, fibers, etc. An example of a reinforcing agent is Cumar LX509 from Neville.

The following examples illustrate specific pressure sensitive adhesive formulations which are coextrudable with the polymeric film materials as described above. These adhesive formulations also can be used as the substrate adhesives although conventional pressure sensitive adhesive can be used for the substrate adhesive when the substrate adhesive is not part of a coextrudate but is incorporated into the construction as an individual layer. Unless otherwise indicated in the following examples, in the claims, and elsewhere in the written description, all parts and percentages are by weight, and temperatures are in degrees centigrade. Glass transition temperatures are measured by DSC.

|  | Percent By Weight |
|---|---|
| Adhesive 1 | |
| Kraton D1320X | 60.0 |
| Escorez 2596 | 40.0 |
| Adhesive 2 | |
| Kraton D1320X | 57.1 |
| Escorez 2596 | 38.1 |
| Kraton LVSI-101 | 4.8 |
| Adhesive 3 | |
| Kraton D1320X | 50.0 |
| Escorez 2596 | 45.8 |
| Kraton LVSI-101 | 4.2 |
| Adhesive 4 | |
| Quintac 3530 | 50.0 |
| Escorez 2596 | 45.8 |
| Kraton LVSI-101 | 4.2 |
| Adhesive 5 | |
| Quintac 3530 | 50.0 |
| Escorez 2596 | 45.8 |
| Isolene D-400 | 4.2 |
| Adhesive 6 | |
| Kraton D1112P | 35.0 |
| Escorez 1310LC | 65.0 |
| Adhesive 7 | |
| Kraton D1117P | 35.0 |
| Escorez 1310LC | 65.0 |

-continued

|  | Percent By Weight |
|---|---|
| Adhesive 8 | |
| Kraton D1112P | 35.0 |
| Escorez 2596 | 65.0 |
| Adhesive 9 | |
| Kraton D1107 | 30.0 |
| Escorez 2596 | 48.0 |
| Kraton LVSI-101 | 22.0 |
| Adhesive 10 | |
| Vector 4111 | 52.6 |
| Wingtack 95 | 31.6 |
| Cumar LX509 | 15.8 |

As noted above, the adhesive constructions of one embodiment of the present invention comprise two layers of a polymeric film and two layers of adhesive layer. The polymeric films may comprise one or more layers.

A coextrusion technique useful in preparing an adhesive construction of one of the embodiments described above is schematically shown in FIG. 1A. The apparatus shown in FIG. 1A utilizes four extruders 10, 11, 12 and 13 which can provide four molten streams (sometimes hereinafter referred to as streams A, B, C and D respectively) of material to the coextrusion die 18. Extruder 10 provides a molten stream 14 of an adhesive composition to the die 18. Extruder 11 provides a molten stream 15 of polymeric film material to the die 18. Extruders 12 and 13 are optional. When present, extruder 12 provides an adhesive stream 16, and extruder 13 provides a molten stream 17 of a polymeric film material, the adhesive and polymer in molten streams 16 and 17, respectively, may be the same as or different from the adhesive and polymer of molten streams 14 and 15.

Figure 1A:
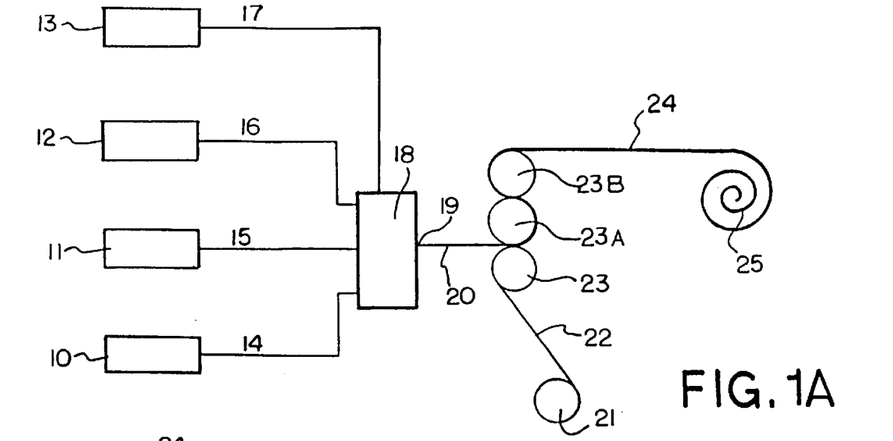
FIG. 1A is a schematic side elevation of one method of making a construction useful in the invention.

In one embodiment, polymer film material is not charged to extruder 12, or the polymer charged to extruder 12 is the same as that charged to extruder 11, and adhesive is not charged to extruder 13. The resulting coextrudate comprises a single layer of polymer film, and a layer of adhesive. The adhesive composites also can be prepared by laminating together two coextrudates prepared in this manner.

The extruders 10, 11, 12 and 13 are utilized to blend and melt the compositions and as pumps to deliver the molten streams to the feedblock and the extrusion die. Alternatively, the compositions may be preblended prior to being introduced into the extruders. The precise extruder utilized is not critical to the process. A number of useful extruders are known, and these include single and twin-screw extruders, batch-off extruders, etc. Such extruders are available from a variety of commercial sources including Killion Extruders, Inc., C. W. Brabender Inc., American Leistritz Extruder Corp, and Davis Standard Corp.

A variety of useful coextrusion die systems are known. Examples of extrusion dies useful in the invention are the Cloeren "vane" dies, and multimanifold dies available commercially from the Cloeren Company of Orange, Tex.

Although the selection of the extrusion die to be utilized in the process of the invention is not critical, certain factors do have an influence on the performance of the extrusion process. For example, when a single manifold is to be utilized, the relative viscosities of the materials, and their ability to be processed at a single manifold temperature must be considered. When the relative viscosities of the materials exceed a tolerable limit, or when a single manifold temperature cannot be tolerated by the materials, multimanifold dies are typically employed. In multimanifold dies, each material flows in its own manifold to the point of confluence. Each individual manifold also can be designed specifically for the rheology of each polymer resin and/or adhesive, and each manifold also can be controlled at different process temperatures.

Multimanifold dies can be designed with zero common land length so that the materials do not meet until the die lip or exit orifice. Alternatively, they can be designed with a short common flow channel. A zero common land would be preferred where the molten streams have extreme viscosity differences and/or temperature requirements. A short common land is generally beneficial because the period of high temperatures and high pressure while the melts are in the common land can improve the bond strength between the layers of the construction. In one embodiment of the present invention, the manifold dies are selected so that the molten streams are joined before the die lip (for example, from about 1 millimeter to about 1 inch before the die lip).

Referring again to FIG. 1A, the unified molten structure 20 of two or more layers exits the extrusion die 18 through orifice 19, and the molten structure is deposited onto a solid substrate 22 (e.g., a release liner) supplied from a roll 21 so that the lower surface of the substrate adhesive layer is in contact with the liner, while the upper surface of the polymeric film is in contact with air. The liner 22 is partially wrapped around the first of a three chill roll stack 23, 23A and 23B. Chill roll 23 also acts as a casting roll. The liner 22 contacts the surface of casting roll 23 and is interposed between the surface of the casting roll and the adhesive layer of the molten stream 20. In the embodiment illustrated in FIG. 1A, the molten structure 20 is deposited on the liner 22 and the construction 24 which is formed in the process then passes over chill rolls 23 A and 23 B and is wound over roll 25 or wound upon itself.

The casting/cooling roll 23 and the chill rolls 23A and 23B typically are maintained at a temperature below the temperature of the unified molten structure 20 in order to cool the molten structure after it is deposited on the liner. Typically this temperature is in the range of from about 5° to about 100° C., preferably from about 20° to about 30° C.

Figure 1B:
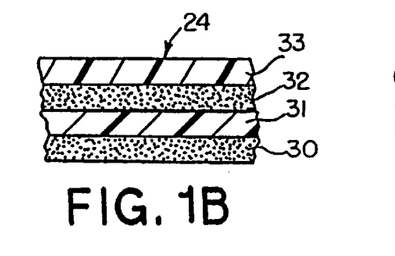
FIG. 1B is a cross-section side view of an adhesive construction useful in the invention is prepared in FIG. 1A.
Figure 1C:
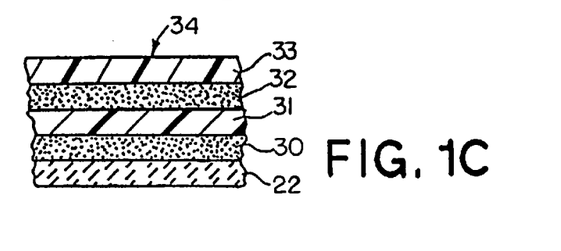
FIG. 1C is a cross-section side view of an adhesive construction useful in the invention as prepared in FIG. 1A with a release liner.

FIG. 1B is a cross-section of the adhesive construction 24 of one embodiment wherein the separation layer is an adhesive. Thus, the adhesive construction 24 illustrated in FIG. 1B comprises a substrate adhesive layer 30, a second polymer film layer 31, an internal adhesive layer 32, and first polymer film layer 33. FIG. 1C is a cross-section of an adhesive construction 34 of the present invention wherein the adhesive construction described in FIG. 1B has a release liner 22 adhesively joined to the lower surface of the substrate adhesive layer 30 of the composite described in FIG. 1B.

Figures 2A, 2B, 2C:
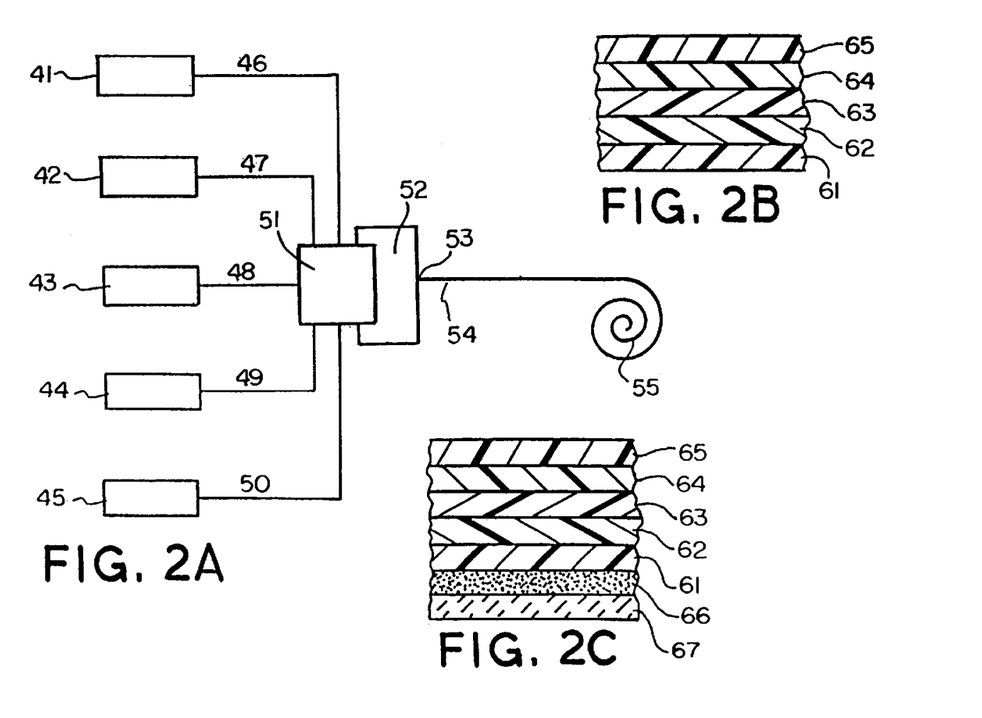
FIG. 2A is a schematic of another method of making an adhesive construction useful in the invention.
FIG. 2B is a cross-section side view of a construction useful in the invention as prepared in FIG. 2A.
FIG. 2C is a cross-section side view of a construction useful in the invention as prepared in FIG. 2A with an adhesive layer and release liner.

FIG. 2A illustrates another coextrusion procedure useful in preparing the constructions useful in the present invention. The apparatus shown in FIG. 2A utilizes five extruders 41, 42, 43, 44 and 45, which provide five molten streams of polymer (sometimes hereinafter referred to as streams A, B, C, D and E respectively) of material. Extruders 41, 42, 43, 44 and 45 provide molten streams 46, 47, 48, 49 and 50, respectively, to a feedblock 51. The molten streams of polymer film material exiting the extruders comprise different polymers, or at least adjacent films comprise different polymers. Thus, for example, the polymer of stream 47 is different from the polymer of streams 46 and 48, and the polymer of stream 49 is different from the polymer of streams 50 and 48. Feedblock 51 in FIG. 2A combines the molten streams of polymeric film material into a single flow channel. The feedblock 51 delivers the molten structure to the extrusion die 52 where the molten structure is reduced in height and increased in width as desired so as to provide a relatively thin and wide construction. An example of a useful feedblock is the Cloeren coextrusion feedblock available commercially from the Cloeren Company of Orange, Tex. The discussion above, with regard to the selection of the extrusion die used in the process of FIG. 1A is applicable to the process of FIG. 2A.

The unified molten structure 54 exits the extrusion die 52 through orifice 53, and the molten structure is cooled by passing over cooling roll 55 (several may be used). The coextruded film then is wound over roll 55 of rolled upon itself. In another example, a sixth extruder is added to the apparatus described in FIG. 2A, and this extruder is utilized to extrude an adhesive layer which is brought into contact with one of the external polymer film layers (e.g., stream 48) within the feed block 51. The molten stream existing the die comprises the five layers of polymer film as described in FIG. 2A, and a layer of adhesive on one outside surface. This molten stream may brought into contact with a substrate such as a release liner, cooled, and rolled upon itself or upon a take up roll by procedure similar to that shown in FIG. 1A.

FIG. 2B is a cross-section of an adhesive construction 54 formed in the process of FIG. 2A and comprises separation layer 63, first stiffening layer 64, second stiffening layer 62, first skin layer 65 and second skin layer 61. FIG. 2C is a cross-section of a label stock utilizing the composite of FIG. 2B with an adhesive layer 66 and release liner 67.

A number of additional steps optionally can be performed on the coextrudate if desired. Thus, for example, the coextrudate may be uniaxially or biaxially oriented (e.g., by heat stretching and heat setting). If it is desired to uniaxially or biaxially orient the coextruded adhesive constructions of the present invention, such orientation preferably occurs before the coextrudate is joined with a support material such as a release liner. For example, if it is desired to orient the coextrudate, the process described with regard to FIG. 1A is modified as follows. The flow of molten material into the die and/or feedblock is rearranged so that the unified molten structures 20 of FIG. 1A has the external adhesive layer on top, and the molten film layer contacts the casting/chill roll 23 where the molten material is cast into a film and cooled. Chill rolls 23A and 23B in FIG. 1A are omitted or rearranged so that the adhesive side of the cast film does not come into contact with the additional chill rolls. After the cast film has cooled, the construction may be subjected to orientation followed by lamination to the release surface of a release liner. In one preferred embodiment of the invention, the adhesive constructions are not oriented.

Machine direction or biaxial orientation of the cooled cast films prepared as described above free of a release liner can be accomplished by techniques known in the art. For example, the films can be oriented in the machine direction by using tentering frames where the clips at the edge of the tentering frame travel faster in the machine direction thereby stretching the film in the machine direction. Alternatively, the clips can be programmed to travel faster in the machine direction or to widen in the cross direction, or to stretch in both directions thereby orienting the film in both directions. When the film is to be stretched using a tenter frame, the edges of the film are preferably free of adhesive so that the clips will not stick to the film. After orientation on the tentering frame, the coextruded adhesive construction then can be laminated to a release liner.

As a further alternative, the adhesive constructions used in the invention can be prepared by (a) separately coextruding two adhesive constructions, each comprising a continuous polymeric film and an adhesive layer as described above and (b) joining the two coextrudates to form a four layer structure of adhesive/film/adhesive/film. The adhesive layer between the two polymeric films shown in FIGS. 1B and 1C contributes to the adhesive properties of the overall construction, particularly when the interior polymeric film elongates under peel conditions, and the adhesive layer also increases the Gurley stiffness by separating the two film layers. It has been discovered that this unique procedure for preparing a composite of two layers of film material and an adhesive material between the two layers of film facilitates the preparation of very thin polymer films (e.g., less than 1 mil and even less than 0.5 mil.

The adhesive constructions used in the present invention such as illustrated in FIGS. 1C, 2C, 3 and 4 can either be collected for future printing, overlaminating, and converting at a different time and/or geographic location, or these constructions can be routed to one or more other stations for printing, overlaminating, and/or converting during the same operation. In an example process, the adhesive construction 24 of FIG. 1A is taken up on roll 25 and saved for future printing, overlaminating and/or conversion. Before printing, it often is desired that the exposed film surface of the adhesive construction of the invention be treated to make the exposed surface of the polymer film more receptive to subsequent printing or marking. In an example embodiment, the construction is treated by conventional surface treatment methods, such as corona treatment and the like, to increase the surface energy of the polymer film layer to facilitate wetting during the printing process.

An important feature of one embodiment of the constructions used in the present invention is the ability to deposit printing indicia or other forms of marking on the upper surface of the upper film layer. Thus, the polymer film material selected for the exposed or upper surface of the constructions should be one which is receptive to printing with inks using printing techniques such as flexographic printing, screen printing, offset lithography, letter press, thermal transfer, etc., and the applied ink has acceptable adhesion to the surface of the adhesive construction.

As mentioned above, the composite constructions of the present invention may be combined with a release liner by contacting a release liner with the substrate adhesive layer to form label construction or label stock. The release liner which may be utilized in the label constructions used in the present invention may comprise any of a variety of materials known to those skilled in the art to be suitable as release liners. In one preferred embodiment, the release liner comprises a silicone coated paper substrate. Coated polymer film substrates also can be used as release liners. The label stock may then be converted to labels by procedures well known to those skilled in the art. Thus, the label stock may be printed and die-cut into individual labels.

The printing step may occur before or after the combining of the adhesive constructions of the invention and the release liner, but will precede the die-cutting of the facestock into individuals labels. The film must remain in accurate register between printing steps (for example, between successive impressions and different colors) in order that image or text may be of high quality, and between printing and subsequent die-cutting in order that the image or text be located properly on the labels. The film is under tension during printing, and may be subjected to some increase in temperature, such as, for example, when UV inks are curred, and the film must maintain dimensional stability in the machine-direction.

The label stock is die-cut into a series of spaced pressure-sensitive labels carried by the release liner. This step may be performed by rotary cutting dies in a well known manner and involves a subsequent stripping of the ladder-shaped matrix of waste or trim materials surrounding the formed labels when they are die-cut (the "rungs" of the ladder representing the spacing between successive labels). The labels then remain on the liner in spaced relation with each other. One failure mode in this operation involves poorly die-cut labels remaining with the matrix as it is stripped. In this mode, as the release levels decrease, poor die-cutting is more likely to cause labels to stay attached to the matrix material and be removed from the liner during matrix stripping along with the matrix. Another failure mode results when the films being die-cut are of insufficient strength. As the strength of the matrix material decreases, the matrix tends to tear as the matrix around the die-cut labels is pulled from the liner. The films of the present invention do have sufficient strength to avoid or reduce breakage of the matrix upstripping. Yet another failure made results when the stiffness of the label is insufficient to be dispensed over a peel-plate at room temperature. The term "peel-plate" as used herein with regard to dispensing and dispensability is not intended to be limited to plates, but it is intended that the term be understood to include equivalent label separation mechanisms such as peel edges, devices with a small radius of curvature etc. Dispensability, as defined earlier, includes the steps of separation of the labels from the liner, and the successful application of the label to a substrate surface.

In accordance with an embodiment of the present invention, die-cut and matrix-stripped label constructions which do not satisfactorily dispense over a peel plate at room temperature can be peel-plate dispensed by lowering the temperature of the label construction by at least 5° C. below room temperature as at least the leading edge of the label passes over the peel plate. Preferably the temperature is reduced to the range of from about −15° C. to 15° C. The degree of reduction in temperature of the label is determined by considering the nature of the facestock material (e.g., type of polymer), the thickness of the facestock, the Tg of the polymer, and the stiffness of the facestock at lower temperatures. Generally, the temperature chosen is one at which the Gurley stiffness of the particular facestock in the machine direction is at least 10 and preferably at least 15.

The temperature of the label construction or the leading edge of a label can be reduced to below room temperature by a variety of methods. For example, a roll of die-cut and matrix-stripped label construction can be cooled in a cooling room or refrigerator and maintained at this temperature until the labels are dispensed over a peel-plate. Another method for cooling the label construction is to pass it over one or more chill rolls just prior to the peel plate. Alternatively, the peel-plate can be cooled by suitable means, and the temperature of the label is reduced as the label passes over the peel-plate. Other techniques for maintaining the label at a desired temperature will be apparent to those skilled in the art. Chill rolls and peel plates can be cooled by methods known to those skilled in the art. One method uses thermoelectric (TE) coolers such as the line of TE coolers available from Tellurex of Traverse City, N.J., under the trade designation ZMAX.

The effect of temperature on the stiffness of 2 mil thick paper (40 lb super calendered) is determined at several temperatures and the results are reported in the following Table III.

TABLE III

| Temperature | Paper Stiffness | |
|---|---|---|
| | Gurley Stiffness (mgs) | |
| (° C.) | MD | CD |
| 25 | 28.80 | 16.18 |
| 15 | 28.69 | 15.18 |
| 5 | 16.76 | 8.87 |
| −5 | 42.80 | 19.29 |
| −14 | 42.89 | 23.18 |

The results indicate that although there is a decrease in stiffness at 5° C., there is a significant increase in the stiffness at −5 and at −14° C.

The effect of temperature on the stiffness (and therefore, the peel plate dispensability) of several examples of plasticized polyvinyl chloride monolayer film is shown as follows. A series of plasticized polyvinyl chloride (PVC 198 from Geon) resin films (2 mils thick) having different glass transition temperatures (Tg) are prepared by varying the amount of plasticizer (Paraplex G-59 from C. P. Hall) blended into the PVC. The blend also contains minor amounts of heat stabilizer, Mark 2181 from Witco, and ultraviolet stabilizer UV 531. The Gurley stiffness is measured at 25° C., 15° C., −5° C., −50° C. and −150° C. The results, summarized in Table IV demonstrate that the stiffness of various vinyl films which have a low machine direction stiffness at room temperature (25° C.) can be increased by lowering the temperature of the film. The results also show that improved results (greater increase in stiffness) are obtained with PVC films having a Tg in the range of about 10° C. to about 30° C. preferably about 18° C. to 30° C.

TABLE IV

| | Film Temperature (0° C.) | PVC SAMPLE | | | | | | | | |
|---|---|---|---|---|---|---|---|---|---|---|
| | | A | B | C | D | E | F | G | H | I |
| MD Gurley Stiffness (mgs) | −15 | 24.0 | 20.8 | 21.0 | 19.8 | 19.6 | 17.6 | 17.4 | 16.4 | 14.1 |
| | −5 | 21.0 | 17.0 | 16.3 | 14.8 | 15.1 | 13.2 | 14.1 | 10.8 | 7.7 |
| | 5 | 16.3 | 13.0 | 12.5 | 10.7 | 9.4 | 8.5 | 8.3 | 5.4 | 4.8 |
| | 15 | 11.8 | 8.5 | 7.4 | 6.1 | 4.7 | 3.7 | 3.0 | 2.4 | 1.6 |

TABLE IV-continued

PVC FILM STIFFNESS AND TEMPERATURE

| Film Temperature | PVC SAMPLE | | | | | | | | |
|---|---|---|---|---|---|---|---|---|---|
| (0° C.) | A | B | C | D | E | F | G | H | I |
| 25 | 3.5 | 6.3 | 5.1 | 4 | 3.4 | 2.7 | 2.4 | 1.8 | 1.3 |
| Tg | — | 30.7 | 23.6 | 18.5 | 16.3 | 12.0 | 7.0 | 3.8 | 3.4 | -7.7 |

From the above results, it is clear that for vinyl films of a certain thickness which are not peel plate dispensable at room temperature, the proper selection of Tg, combined with a suitable reduction in separation temperature will result in a peel plate dispensable vinyl film using a minimum amount of vinyl.

Similar testing is conducted using three different oriented polypropylene (PP) monolayer films identified as Samples A (2.5 mils), B (2.2 mils) and C (2 mils). The results are reported in the following Table V.

TABLE V

ORIENTED POLYPROPYLENE FILM GURLEY STIFFNESS (mgs)
PP SAMPLE

| FILM | A | | B | | C | |
|---|---|---|---|---|---|---|
| TEMPERATURE ° C. | MD | CD | MD | CD | MD | CD |
| -14 | 53.4 | 22.4 | 20.8 | 42.5 | 19.4 | 33.7 |
| -5 | 40.9 | 18.5 | 18.5 | 38.8 | 17.1 | 30.2 |
| 5 | 30.3 | 16.7 | 16.6 | 34.1 | 15.6 | 27.5 |
| 15 | 21.3 | 14.3 | 13.5 | 29.3 | 13.5 | 23.6 |
| 25 | 17.4 | 11.7 | 12.2 | 26.4 | 11.0 | 20.5 |

These results demonstrate that the stiffness of a given sample of an oriented polypropylene film can be increased by lowering the temperature of the film. One skilled in the art thus can increase the peel plate dispensability of a given PP film by lowering the temperature of at least the leading edge of the film. Also, knowing these results, one skilled in the art can select a thinner than normal film (reduce costs) and still be able to dispense the film over a peel plate by reducing the temperature of at least the leading edge of the film as the film passes over the peel plate.

The effect of temperature on two additional constructions comprising multilayer film facestocks comprising a base layer and skin layers on both surfaces of the base layer is demonstrated by measuring the Gurley Stiffness (MD), at several temperatures. The thickness of the base layer is 70% of the overall thickness of the multilayer film, and each skin layer is 15% of the total thickness. The films are prepared by coextrusion of the three layers followed by heating, stretching in the machine direction only, and heat setting as described in U.S. Pat. No. 4,713,273. Additional details regarding the particular films are contained in the following Table VI

TABLE VI

| Film Example | Thickness (Mils) | Base Layer | Skin Type[1] | M.D. Orientation Stretch Ratio |
|---|---|---|---|---|
| 14 | 2.5 | CoPP/EVA/HPP/TiO$_2$/CaCO$_3$ | HPP/EVA | 5.25:1 |
| 15 | 3.5 | HPP/EVA/CaCO$_3$/TiO$_2$ | HPP/EVA | 5.25:1 |

(A) CoPP - random copolymer of ethylene and propylene
EVA - ethylene vinyl acetate copolymer
HPP - propylene homopolymer The results of the stiffness testing are summarized in Table VII, and these results show that the stiffness of these films is increased, (and the peel-plate dispensability can be improved) by lowering the temperature of the film. Alternatively, knowing these results, the thickness of a film can be reduced as a cost saving, and the thinner film can be peel-plate dispensed by lowering the temperature of the film which passes over a peel-plate.

TABLE VII

| | Gurley Stiffness | |
|---|---|---|
| Film Example | Temperature (° C.) | MD Gurley Stiffness (mgs) |
| 14 | 25 | 12.9 |
| | 15 | 13.5 |
| | 5 | 20.3 |
| | -5 | 28.5 |
| | -15 | 35.6 |
| 15 | 25 | 34.3 |
| | 15 | 44.6 |
| | 5 | 61.7 |
| | -5 | 76.0 |
| | -15 | 95.2 |

The effect of temperature on the stiffness of copolyester multilayer label constructions with different layer thicknesses is demonstrated by measuring the stiffness (Gurley), at several temperatures, of several samples. The composite coextruded facestocks used in the following Examples 10–13 comprise a first polymer film of Vitel 4400B (a copolyester from Bostik having a Tg of 28° C.) and a second polymer film of Vitel 4400B separated by a layer adhesive comprising about 50% adhesive (Quintac 3530 from Nippon Zeon), 45.8% of a tackifier (Escorez 2596) and 4.2% of a liquid rubber (LVSI 101). The thickness of the layers and the overall thickness of the label construction are shown in Table VIII. Control A does not contain any internal adhesive (no separation layer). The results are summarized in Table VIII.

TABLE VIII

Gurley Stiffness - Composite Facestocks

| Example | Layer Thickness (Mils) | Total Thickness (Mils) | Temperature (° C.) | Gurley Stiffness MD | Gurley Stiffness CD |
|---|---|---|---|---|---|
| Control A | — | 2 | 25 | 1.2 | 1.3 |
| | | | 15 | 10.0 | 10.7 |
| | | | 5 | 12.6 | 12.5 |
| | | | −5 | 14.1 | 13.3 |
| | | | −15 | 13.1 | 12.0 |
| 10 | 0.5:1:0.5 | 2 | 25 | 8.77 | 6.52 |
| | | | 15 | 16.93 | 13.87 |
| | | | 5 | 20.07 | 15.23 |
| | | | −5 | 20.20 | 15.43 |
| | | | −15 | 21.03 | 16.38 |
| 11 | 1:1:1 | 3 | 25 | 15.26 | |
| | | | | 16.04 | |
| | | | 15 | 29.13 | 28.63 |
| | | | 5 | 32.48 | 31.92 |
| | | | −5 | 35.86 | 34.75 |
| | | | −15 | 38.64 | 37.25 |
| 12 | 0.5:2:0.5 | 3 | 25 | 16.10 | |
| | | | | 13.87 | |
| | | | 15 | 30.91 | 24.80 |
| | | | 5 | 32.48 | 26.30 |
| | | | −5 | 33.94 | 27.07 |
| | | | −15 | 35.67 | 28.32 |
| 13 | 1:2:1 | 4 | 25 | 31.97 | |
| | | | | 27.91 | |
| | | | 15 | 59.08 | 51.71 |
| | | | 5 | 65.75 | 57.41 |
| | | | −5 | 66.44 | 61.72 |
| | | | −15 | 72.56 | 63.11 |

The above results demonstrate that the stiffness of the facestock can be increased significantly by lowering the temperature of the facestocks.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of improving the peel-plate dispensability of a die-cut and matrix-stripped label construction comprising a facestock, a release liner, and a substrate adhesive layer between the facestock and the liner which comprises maintaining the temperature of at least the leading edge of the label below about 20° C. as the leading edge of the label construction moves over a peel-plate, and the label is separated from the release liner.

2. The method of claim 1 wherein the temperature of at least the leading edge of the label construction is maintained at or below about 15° C. as the leading edge moves over the peel-plate.

3. The method of claim 1 wherein the facestock comprises a monolayer polymer film facestock.

4. The method of claim 1 wherein the facestock comprises a multilayer polymer film facestock.

5. The method of claim 4 wherein the multilayer facestock comprises a base layer having an upper surface and a lower surface, and a skin layer on at least the upper surface of the base layer.

6. The method of claim 4 wherein the multilayer facestock comprises a base layer having an upper surface and a lower surface, a first skin layer adhered to the upper surface of the base layer, and a second skin layer adhered to the lower surface of the base layer.

7. The method of claim 5 wherein the multilayer facestock comprises a coextrudate.

8. The method of claim 6 wherein the multilayer facestock comprises a coextrudate.

9. The method of claim 5 wherein the base layer is thicker than the skin layers.

10. The method of claim 6 wherein the base layer is thicker than the skin layers.

11. The method of claim 5 wherein the base layer comprises a polyolefin.

12. The method of claim 6 wherein the base layer comprises a polyolefin.

13. The method of claim 5 wherein the base layer comprises a polymer or copolymer of ethylene or propylene.

14. The method of claim 6 wherein the base layer comprises a polymer or copolymer of ethylene or propylene.

15. The method of claim 6 wherein the base layer contains a particulate filler.

16. The method of claim 6 wherein the base layer is free of particulate filler.

17. The method of claim 5 wherein the skin layer on the upper surface of the base layer is free of filler particles.

18. The method of claim 6 wherein the first skin layer is free of filler particles.

19. The method of claim 5 wherein the skin layer on the upper surface of the base layer is ink printable.

20. The method of claim 6 wherein the first skin layer is ink printable.

21. The method of claim 6 wherein the total thickness of the facestock is from about 0.4 to about 3.5 mils.

22. The method of claim 6 wherein the total thickness of the facestock is from about 0.4 to about 2.5 mils.

23. The method of claim 6 wherein the total thickness of the facestock and the substrate adhesive is from about 0.5 to about 3.5 mils.

24. The method of claim 1 wherein the facestock is characterized as exhibiting an increase in the MD Gurley stiffness of at least about 10 units when the temperature of the facestock is reduced from 25° C. to about 5° C.

25. The method of claim 1 wherein the facestock is characterized as exhibiting an increase in the MD Gurley stiffness of at least about 15 units when the temperature of the facestock is reduced from 25° C. to about 5° C.

26. The method of claim 4 wherein the multilayer facestock comprises first and second continuous polymer films, each having an upper surface and a lower surface, and each independently having a thickness of from about 0.1 to about 2 mils, and said first and second films are separated by a continuous layer of material having a Young's Modulus less than the Young's Modulus of the first and second films.

27. The method of claim 26 wherein the first and second films are separated by a polymer film material.

28. The method of claim 26 wherein the first and second films are separated by a continuous layer of interior adhesive.

29. The method of claim 26 wherein the second continuous film is adhered to the substrate adhesive layer and has a glass transition temperature in the range of from about 10° to about 30° C.

30. The method of claim 28 wherein the interior adhesive is a pressure sensitive adhesive.

31. The method of claim 26 wherein the substrate adhesive is a pressure sensitive adhesive.

32. The method of claim 3 wherein the total thickness of the facestock is from about 0.2 to about 2.5 mils.

33. The method of claim 4 wherein the total thickness of the composite facestock is from about 0.4 to about 3.5 mils.

34. The method of claim 4 wherein the total thickness of the facestock is from about 0.5 to about 2.5 mils.

35. The method of claim 26 wherein the first and second polymer films are each independently selected from polystyrenes, polyolefins, polyamides, polyesters, polycarbonates, polyurethanes, polyacrylates, polyvinyl chloride, polyvinyl alcohol, polyethylene vinyl alcohol), polyvinyl acetates, ionomers, and mixtures thereof.

36. The method of claim 26 wherein the first and second polymer films comprise a blend comprising a major amount of polyolefin.

37. The method of claim 26 wherein the first and second polymer films comprise polyolefins.

38. The method of claim 26 wherein the substrate adhesive layer has a coat weight in the range of from 0.5 to about 30 g/m2.

39. The method of claim 26 wherein the first and second polymer films, the separation layer, and the substrate adhesive layer comprise a coextrudate.

40. The method of claim 26 wherein the first polymeric film and the separation layer comprise a first coextrudate, and the second polymeric film and the substrate adhesive comprise a second coextrudate.

41. The method of claim 39 wherein the coextrudate has not been monoaxially or biaxially oriented.

42. The method of claim 39 wherein the coextrudate has been oriented in the machine direction.

43. The method of claim 39 wherein the coextrudate has been biaxially oriented.

44. The method of claim 28 wherein the substrate adhesive layer and the interior adhesive layer comprise an adhesive composition comprising a thermoplastic elastomer component and a solid tackifier resin component.

45. The method of claim 44 wherein the adhesive composition also comprises at least one liquid rubber component.

46. The method of claim 28 wherein the substrate and the interior adhesive layers comprise a pressure sensitive adhesive composition which comprises from about 40 to about 80% by weight of a thermoplastic elastomer component and from about 20 to about 60% by weight of a solid tackifier resin component.

47. The method of claim 46 wherein the thermoplastic elastomer component comprises at least one thermoplastic elastomer block copolymer.

48. The method of claim 1 wherein the facestock has a MD Gurley stiffness of less than 10 at 25° C., and a MD Gurley stiffness of at least 10 at the maintained temperature.

49. The method of claim 1 wherein the facestock has a MD Gurley stiffness of less than 10 at 25° C. and a MD Gurley stiffness of at least 15 at the maintained temperature.

50. A method of improving the peel-plate dispensability of a die-cut and matrix-stripped polymer film label construction comprising a multilayer film facestock having an upper surface and a lower surface, a release liner having an upper surface and a lower surface, and a substrate adhesive layer between the lower surface of the facestock and the upper surface of the release liner, which method comprises maintaining the temperature of at least the leading edge of the label at or below about 20° C. as the leading edge of the label construction moves over a peel-plate, and the label is separated from the release liner.

51. The method of claim 50 wherein the temperature of at least the leading edge of the label is maintained between about −15° and about 15° C. as the label moves over the peel-plate.

52. The method of claim 50 wherein the multilayer facestock comprises a base layer having an upper surface and a lower surface, and a skin layer on at least the upper surface of the base layer.

53. The method of claim 50 wherein the multilayer facestock comprises a base layer having and upper surface and a lower surface, a first skin layer adhered to the upper surface of the base layer, and a second skin layer adhered to the lower surface of the base layer.

54. The method of claim 52 wherein the multilayer facestock comprises a coextrudate.

55. The method of claim 53 wherein the multilayer facestock comprises a coextrudate.

56. The method of claim 52 wherein the base layer is thicker than the skin layers.

57. The method of claim 53 wherein the base layer is thicker than the skin layers.

58. The method of claim 52 wherein the base layer comprises a polyolefin.

59. The method of claim 53 wherein the base layer comprises a polyolefin.

60. The method of claim 53 wherein the base layer comprises a polymer or copolymer of ethylene or propylene.

61. The method of claim 53 wherein the base layer comprises a polymer or copolymer of ethylene or propylene.

62. The method of claim 52 wherein the first skin layer is ink printable.

63. The method of claim 53 wherein the first skin layer is ink printable.

64. The method of claim 50 wherein the multilayer film facestock comprises first and second continuous polymer films, each having an upper surface and a lower surface, and each independently having a thickness of from about 0.1 mil to about 2 mils, said first and second films being separated by a continuous layer of material having a Young's Modulus less than the Young's Modulus of the first and second films.

65. The method of claim 64 wherein the first and second films are separated by a polymer film material.

66. The method of claim 64 wherein the first and second films are separated by a continuous layer of interior adhesive.

67. The method of claim 64 wherein the second film is adhered to the substrate adhesive layer and has a glass transition temperature of from about 10° to about 30° C.

68. The method of claim 66 wherein the interior adhesive is a pressure sensitive adhesive.

69. The method of claim 64 wherein the substrate adhesive is a pressure sensitive adhesive.

70. The method of claim 50 wherein the total thickness of the facestock is from about 0.4 to about 3.5 mils.

71. The method of claim 50 wherein the total thickness of the facestock is from about 0.5 to about 2.5 mils.

72. The method of claim 50 wherein the first and second polymer films comprise polyolefins.

73. The method of claim 50 wherein the first and second polymer films, the separation layer, and the substrate adhesive layer comprise a coextrudate.

74. The method of claim 50 wherein the multilayer facestock has an MD Gurley stiffness of less than 10 at 25° C., and an MD Gurley stiffness of at least 10 at the maintained temperature.

75. The method of claim 50 wherein the multilayer facestock has a MD Gurley stiffness of less than about 10 at 25° C. and an MD Gurley stiffness of at least about 15 at the maintained temperature.

* * * * *